Nov. 23, 1965  J. A. KAYSER  3,218,692
PROCESS FOR ASSEMBLING A SEALING MEANS ON THE TRUNNION OF A
UNIVERSAL JOINT
Filed June 5, 1963  3 Sheets-Sheet 1

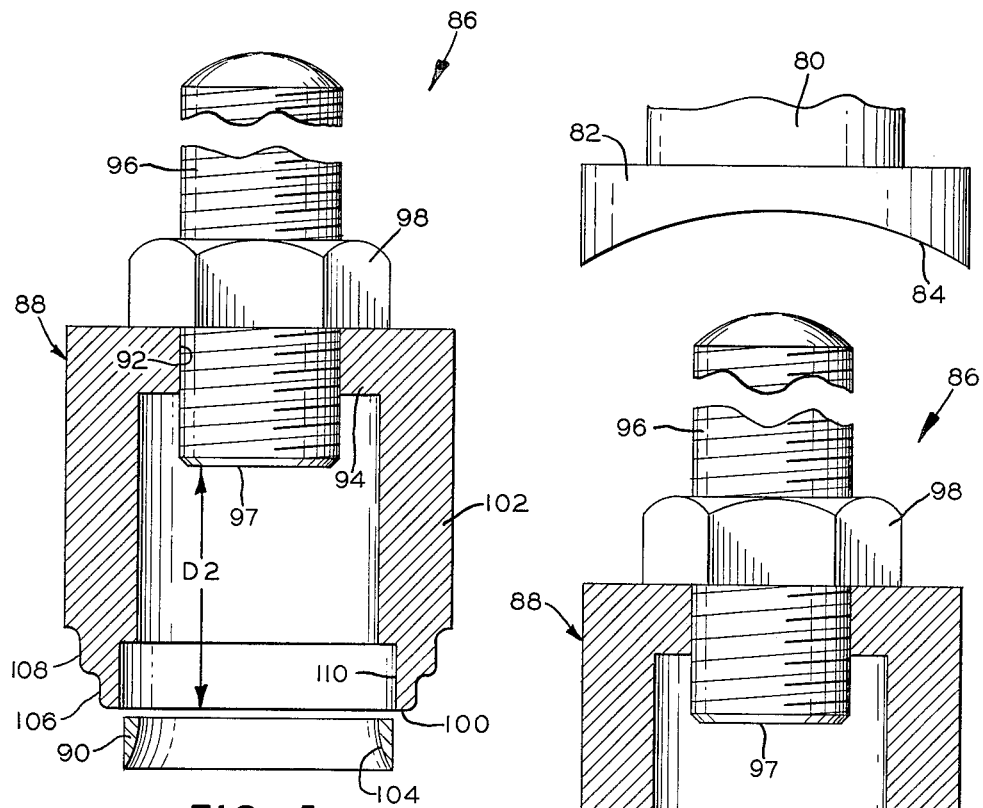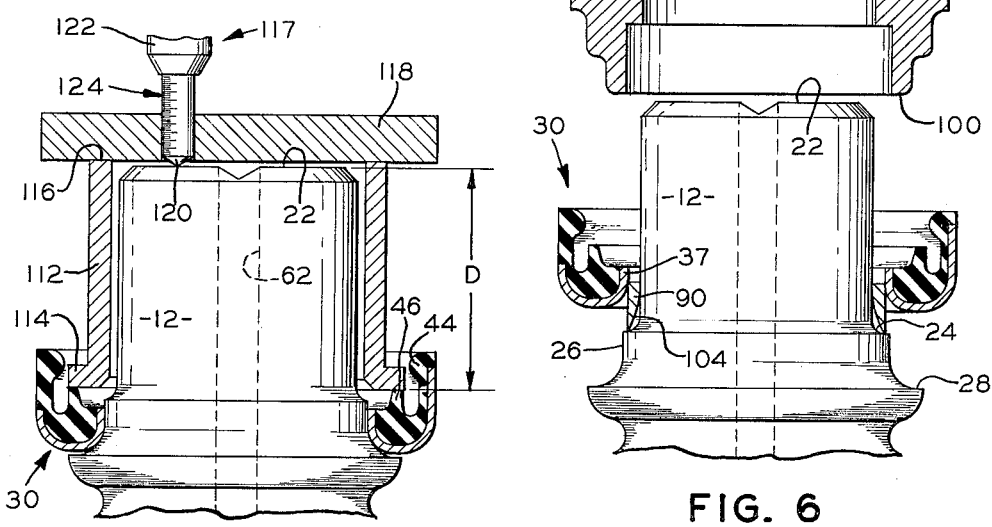

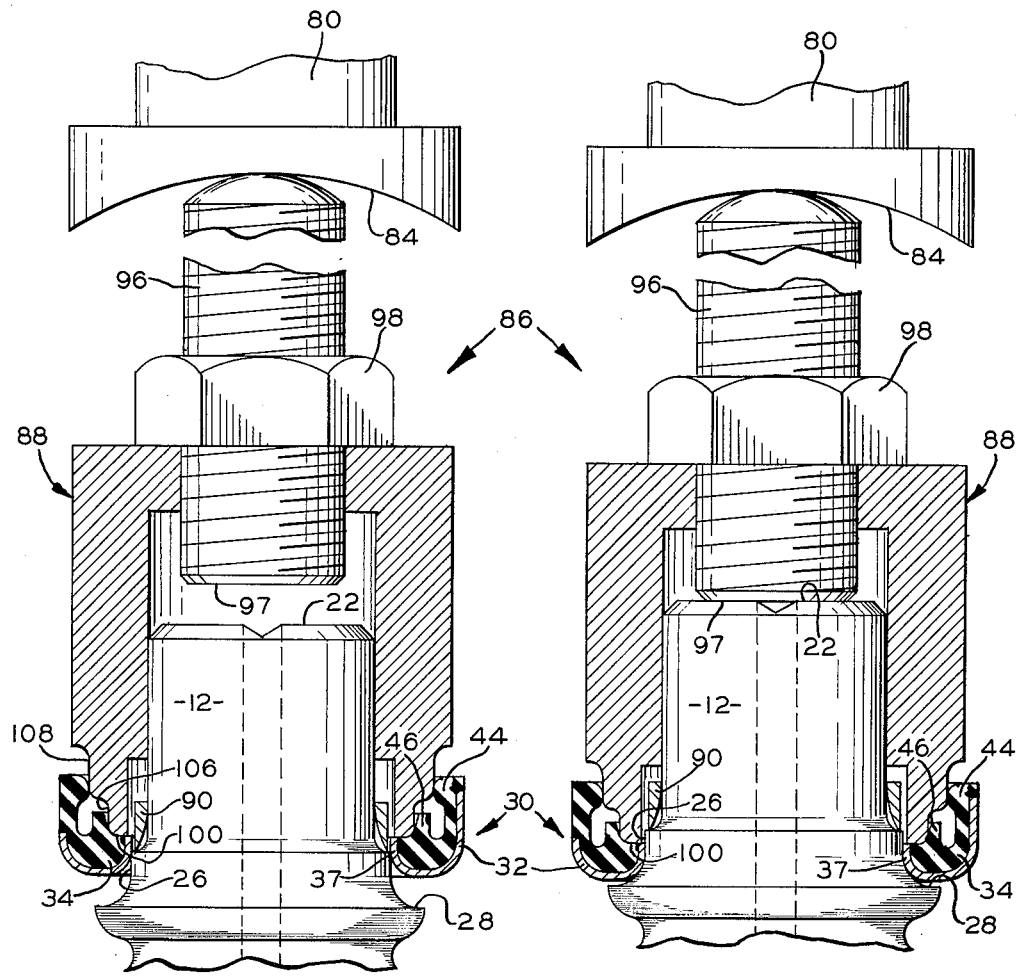

United States Patent Office 3,218,692
Patented Nov. 23, 1965

3,218,692
PROCESS FOR ASSEMBLING A SEALING MEANS
ON THE TRUNNION OF A UNIVERSAL JOINT
John A. Kayser, Oregon, Ohio, assignor to Dana Corporation, Toledo, Ohio, a corporation of Virginia
Filed June 5, 1963, Ser. No. 285,769
6 Claims. (Cl. 29—148.4)

This invention relates to seals in general and more particularly to the method of assembling a seal on the trunnion of a universal joint which is applicable, but not limited to Cardan universal joints, which seal is adapted to seal the opening between the trunnion and a cup-shaped bearing race subsequently positioned on the trunnion.

Prior art means for sealing the junction of the open end of the cup-shaped bearing race and a trunnion have taken many forms. The earliest constructions were merely metallic elements which fixedly engaged either the trunnion or the bearing race and slidingly engage the other. Later developments in the art included a resilient element, with and without metallic portions, formed so as to engage the trunnion member and also engage the race member; the resilient portion being resiliently deformed and slidingly engaged by one of the members.

Both the above types of seals have displayed shortcomings in that the engagement between the seal and the members was not or cannot be closely controlled, that is, when the tolerances of the various components accumulate, there is no certainty of proper engagement of the seal with the joint members unless excessive engagement and deformation are planned on to insure engagement on the low side of the tolerance range, in which case on the high side of the tolerance range the excessive engagement results in badly deformed parts and early wear due to high friction.

It is therefore an object of this invention to provide a method of assembling such a seal on a universal joint wherein proper engagement between the seal and the joint members is insured.

It is another object of this invention to provide a method of assembling such a seal on a universal joint member wherein tolerance variations in the joint members and in the seal itself do not interfere with the desired degree of sealing engagement.

It is yet another object to provide such a method of assembly which is inexpensive, easy, yet results in a durable, satisfactory sealing arrangement.

Further and other objects of this invention will become apparent upon a consideration of the specification when viewed with the following drawings wherein:

FIG. 5 is a sectional view of a tool for assembling the seal on the journal cross;

FIG. 6 is an enlarged side elevational view of a trunnion, the seal and the assembly tool just prior to assembly;

FIG. 7 is a view according to FIG. 6 with the assembly partially completed;

FIG. 8 is a view according to FIGS. 6 and 7 with the assembly completed and the tool remaining in place; and FIG. 9 is a sectional view of the trunnion and seal assembly with an inspection tool positioned thereon.

Figure 1:
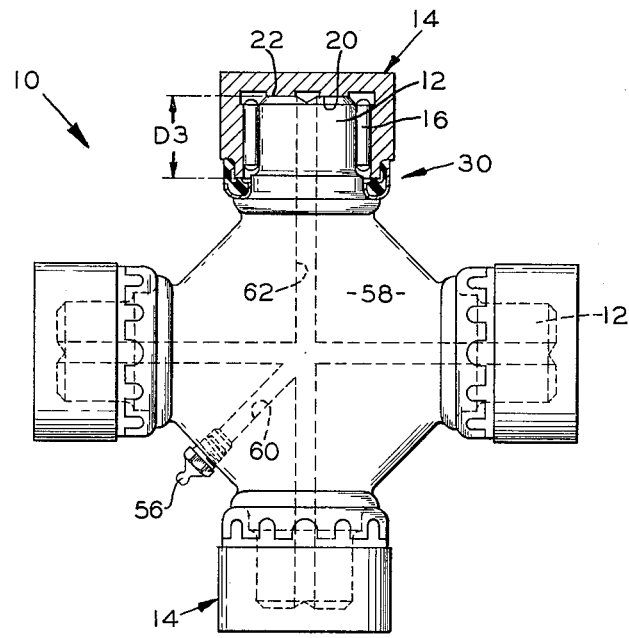
FIG. 1 is a front elevational view of a journal cross and bearing race assembly with one trunnion and race shown in section.

In one preferred embodiment of this invention and the method for obtaining the same, a trunnion having the external end thereof adapted as a thrust face receives thereon a cup-shaped bearing race, with the inner end face adapted as a thrust surface and thrustingly engaging the trunnion thrust face. Interposed between the open end of the bearing race and the trunnion is a sealing means which includes an annular metallic portion pressingly engaging the trunnion and an elastomeric portion including an annular lip compressively engaging the inner end of the race adjacent the opening therein. The amount of compression between the lip and the race is critical, for if it is too great, the lip will soon wear out due to excessive friction and will not allow bleed-off for relubricating the bearing race, and if it is not compressed enough it will not be a satisfactory seal in that it will not allow lubricant spin-out and the ingress of contaminants.

To obtain the desired compression, the distance from the inner end of the race to its thrust face is carefully controlled and the sealing means is pressed on the trunnion to a controlled distance from the thrust face of the trunnion to the top of the annular lip. Accordingly, when the bearing race is assembled on the trunnion with their thrust faces in engagement, the compression on the lip will be a controlled amount.

If the above precautions were not taken and the prior art manner of assembly were used, proper compression would not always be obtained; that is, merely providing a shoulder on the trunnion and pushing the metallic portion of the sealing means home against the shoulder. With this method, the machining tolerance of the trunnion thrust face to shoulder, the tolerance of the sealing means height, and the tolerance of the bearing race would all affect the compression. With applicant's method, the trunnion to shoulder dimension is not important for sealing means positioning as long as it is at a sufficient distance so that the sealing means does not go home against the same prior to reaching its proper position. Also, the dimension of the height of the seal is not critical since the same does not abut a shoulder on the trunnion. Accordingly, only one dimension need be carefully controlled in machining, that is, the distance from the bearing race thrust face to the inner end of the bearing race, and in assembly the distance the sealing means is pressed on the trunnion is easily controlled.

Another advantage obtained with this sealing means and method of assembly is that by not pressing the sealing means against a shoulder on the trunnion to position the same, there is no danger of deforming the sealing means by inadvertently excessively pressing the same against the shoulder.

Referring to the drawings, a journal cross 10 has a plurality of radially extending trunnions 12 which each receives a cup shaped bearing race 14. Interposed between each trunnion and the bearing race thereon is an annulus of needle bearings 16 which provide substantially frictionless engagement therebetween so that the races and trunnions may rotate freely relative to each other. An internal inner end face 20 of the race 14 is adapted as a thrust face and thrustingly engages an outer end thrust face 22 of the journal cross 10.

The trunnions have a first arcuate shoulder 24 adapted to limit inward movement of the needle bearings 16, which shoulder terminates in a seal engaging diameter 26. A second arcuate shoulder 28 terminates the seal engaging diameter 26, and is provided for strength, seal protection and machining purposes.

Means are provided to seal the opening between the open end of the bearing race 14 and the trunnion diameter 26 to prevent the ingress of contaminants and the undesirable egress of lubricants. An annular seal shown generally at 30 includes an annular metallic element 32 and an annular elastomeric element 34; the latter being molded to the former; however, these elements can be formed separately and merely abut each other or be bonded together.

The metallic element 32 is substantially J-shaped in cross section and includes an arcuate base portion 36, and an internal substantially straight, radially outwardly extending trunnion pressing portion 37 and a substantially straight, radially outwardly extending support portion 38. The support portion 38 is formed with a plurality of equally spaced slots 40 thereby defining a plurality of finger portions 42. The resilient elastomeric element 34 is also substantially J-shape in cross section, fitting within the metallic element 32, and comprises an annular peripheral lip 44 and a radially outwardly extending second annular lip 46. The lips 44 and 46 are joined by an intermediate portion 48 which actually only functions as a spacer or support and can be omitted if desired.

The seal 30 is pressed on the trunnion 12 with the internal straight portion 37 engaging the seal engaging diameter 26, but preferably with the base portion 36 spaced from or merely lightly nondeformingly touching the shoulder 28; the portion 37 having a slightly smaller diameter than the seal engaging diameter 26 so that a pressed fit exists therebetween. The lip portion 44 compressively engages an annular groove 50 formed in the periphery of the bearing race 14 adjacent a sealing face 52 formed on the radially inner end of sidewalls 54 thereof, the lip 44 being held against the race 14 by its own resiliency and by the supporting portion 38 of the metallic element 32 of the seal 30. It is now apparent that the supporting portion 38 is formed of a plurality of fingers 42 so that the same may elastically deform during the fitting of the lip 44 in the groove 50 and once so fitted, the fingers press the lip 44 compressively against the same.

Figure 2:
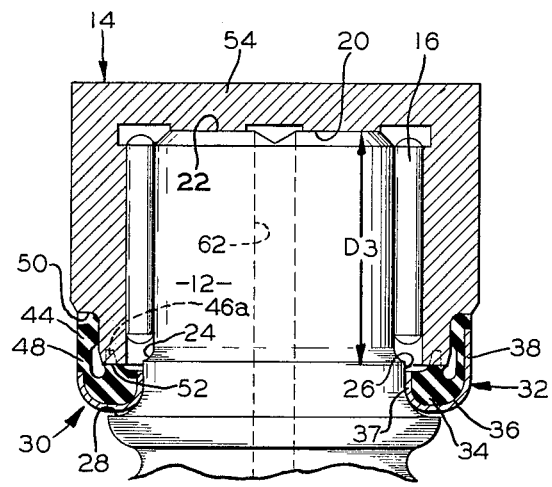
FIG. 2 is an enlarged fragmentary view of a portion of the trunnion, seal and race shown in section in FIG. 1.

The lip portion 46 compressively engages the sealing face 52 of the race 14; the seal 30 having been positioned on the trunnion 12 whereby with the thrust face 20 of the race 14 engages the thrust face 22 of the trunnion 12 and the lip 46 is compressed and bent laterally outwardly from its original position, shown in phantom at 46a, to that shown at 46 in FIG. 2. The amount of compression and bending, that is, the radial reduction in the height of the lip 46 from its free height, has been found as a result of testing, to be most satisfactory when it lies between a range of .012" and .030". With a compression of the lip 46 of less than .012", the same does not function to satisfactorily seal against the face 52 and will allow lubricant spin out and contaminants to leak into the bearing race. With a compression of the lip 46 of more than .030" the lip will wear out from high friction rubbing with the face 52, and when the space between the trunnion 12 and bearing race 14 is lubricated, through a zerk fitting 56 secured to the body 58 of the journal cross 10 and confluent with the space through a passageway 60 and a passageway 62, the excessive sealing does not allow proper bleed-out of entrapped air and lubricant.

It should be noted that the lip 46 when deformed within the desired limits has a one way valve effect in that it will deflect farther laterally outwardly from the position shown in FIG. 2 to allow lubricant and air to flow outwardly between the same and the face 52, but pressure in a reverse direction attempts to straighten the lip and thereby further perfects its engagement with the face 52.

A preferred method is used for assembling the seal 30 on the trunnion 12 so that the distance D (see FIGURE 9) between the thrust face 22 and the top of the undeformed lip 46 is such that when the bearing race 14 is positioned on the trunnion with the race's thrust face 20 engaging the thrust face 22 the desired deformation of the lip 46 will be effected.

Figure 4:
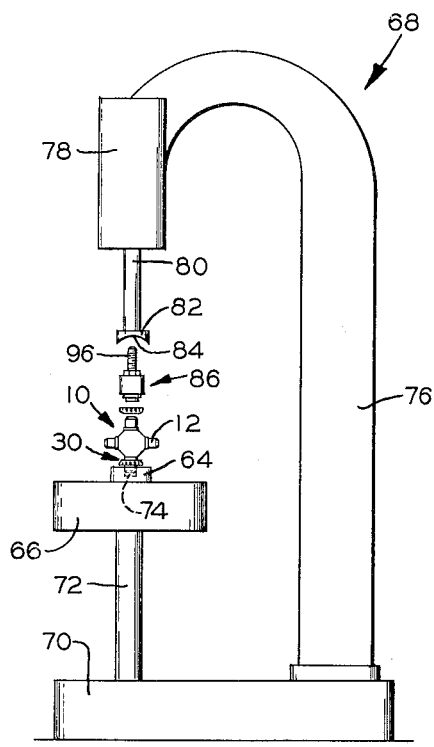
FIG. 4 is a side elevational view of the seal and journal cross positioned on a power press prior to being assembled.

The journal cross 10 is positioned in a holding fixture 64 (see FIG. 4) carried by a supporting platform 66 of a power press 68, the press having a base 70 and an upright supporting member 72 upon which the platform is secured.

The fixture 64 has an opening 74 dimensioned to register with a trunnion 12 of the journal cross 10 and of a depth so that the bottom of the opening 74 engages the thrust face 22 of the trunnion and maintains the registered trunnion projecting sufficiently above the fixture 64 so that the seal 30 mounted on the registered trunnion does not engage the top of the fixture. The press 68 has a second upright supporting member 76 which carries a power cylinder 78, the latter including a piston 80 terminating in an anvil 82 having a lower concave arcuate face 84 coaxial with the opening 74 and adapted to engage a tool, shown generally at 86, which in turn engages and presses the seal 30 into position on the upwardly extending trunnion 12 positioned thereunder.

The tool 86 includes a cup shaped pressing member 88 and an annular guiding member 90. A threaded opening 92 is formed centrally in a back face 94 of the pressing member 88 and threadedly received therein is an adjusting screw 96. A lock nut 98 is threaded on the screw 96 and abuttingly engages the back face 94 to secure the position of the inner end 97 of the screw 96 relative to an annular engaging face 100 provided by the end of side walls 102 of the pressing member 88. The top of the screw 96 is formed convexly arcuate to cooperate with the concavely arcuate face 84 of the anvil 82.

As shown in FIG. 6, the guiding member 90, having an internal diameter slightly greater than the diameter of the trunnion 12, is positioned on the trunnion with the lower end thereof engaging the outer end of the shoulder 24; the inner portion of the lower end of the guiding member having been formed arcuately, as shown at 104, so that it is spaced from the inner arcuate portion of the shoulder. The periphery of the guiding member 90 has a diameter slightly less than the seal engaging diameter 26 of the trunnion 12.

The seal 30 is then positioned around the trunnion 12 and allowed to rest against the top of the guiding member 90. As shown in FIG. 7, the pressing member is then lowered over trunnion 12 with the face 100 engaging the upper end of the trunnion engaging portion 37 of the metallic element 32 of the seal 30. The cylinder 78 is then energized to extend the piston 80 therefrom which presses the anvil 82 against the screw 96 and the pressing of the tool 86 against the seal 30 forcing the same over the guiding member 90 and the seal engaging diameter 26 of the trunnion 12. This pressing continues until the inner end 97 of the screw 96 engages the thrust face 22 of the trunnion 12 which limits the downward pressing of the tool 86.

Figure 3:
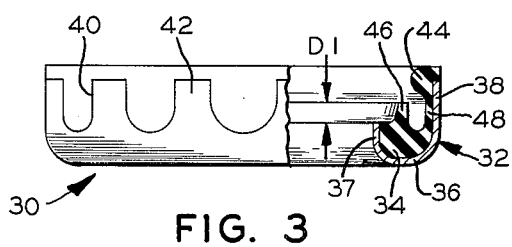
FIG. 3 is a side elevational view of the seal for use in this invention with portions broken away and shown in section.

The distance D1 indicated in FIG. 3 between the top of the trunnion engaging portion and the top of the lip 46 is controlled in manufacturing so as to fall within desired tolerances. The distance D2, indicated in FIG. 5, between the inner end 97 of the screw 96 and the face 100 of the tool is threadedly adjusted so that when the end 97 engages the thrust face 22 of the trunnion 12, the distance D, indicated in FIG. 9, between the thrust face and the top of the lip 46 is as desired or from .012"–.030" less than the distance D3, indicated in FIGS. 1 and 2, between the thrust face 20 and the face 52 of the bearing race 14. Accordingly, when the bearing race 14 is positioned on the trunnion 12 with the thrust faces 20 and 22 in engagement, the face 52 of the race will decrease the height of the lip 46 of seal 30 from .012"–.030" by combined compression and bending the lip thereby providing a satisfactory seal therebetween.

The periphery of the pressing member 88 is provided with a first reduced diameter 106 adjacent the face 100 so as to avoid pressing on the lip 46, and a second reduced diameter 108 adjacent the diameter 106 so that the member 88 can pass within the lip 44. The internal diameter of the member 88 is counterbored at 110 adjacent the face 100 to a sufficient depth so that the member 88 will pass over the guiding member 90; the counterbore being of a diameter slightly greater than the seal engaging diameter 26 of the trunnion 12 so as to guidingly pass thereover.

In this assembly operation, the guiding member 90 pilots the seal 30 to inhibit cocking and also inhibits inward bending of the trunnion engaging portion 37 of the seal 30 while the elastomeric element 34 inhibits outward bending, however, since there is not as great a tendency for the portion 37 to bend outwardly as there is to bend inwardly, this inhibiting by the elastomeric element 34 need be of a very low degree. Since the metallic element 32 does not engage the shoulder 28 of the trunnion 12 to limit the downward pressing of the seal 30, there is no chance of inadvertently deforming the seal through such engagement, and since the distance D2 is easily adjustably controlled, the distance D3, between the faces 20 and 52 of the bearing race 14 is the only machining tolerance which need be accurately maintained to obtain the desired deflection of the lips 46 by the face 52.

A gage 112 is provided to easily measure the distance D, which gage is of annular configuration and has an internal diameter greater than the trunnion 12. An outwardly extending flange 114 is formed on the lower end thereof, which flange has a periphery smaller than the internal diameter of the lip 44. The lower surface of the flange 114 is adapted to engage the top of the lip 46, and the distance from the lip engaging surface of flange 114 to the top 116 of the gage 112 is selected to the low limit of the tolerance range for the distance D, that is, a distance so that when the bearing race 14 is assembled on the trunnion 12, the lip 46 will have its height reduced .012″.

A depth gage 117 of a well known type including an engaging bar 118, an adjustable mandrel 120, an adjusting mechanism 122 and measurement indications 124, is positioned with the bar 118 engaging the top 116 of the gage 112 and measurements taken to determine the relationships between the thrust face 22 and the top 116 of the gage 112. If the thrust face 22 extends above the top 116 then the distance D is too great and the lip 46 will be deflected less than .012″, while if the top 116 extends above the thrust face 22 more than .018″ then the lip 46 will be deflected more than .030″. Since the adjusting screw 96 may be adjusted in the member 88 to change the distance D2 between the end 97 of the screw and the face 100 of the member 88, the position of the seal may be easily controlled to maintain a desired distance.

The above description of an embodiment of this invention, and the method for obtaining the same is deemed to be illustrative only, and not for the purpose of limiting this invention which is defined by the following claims.

What is claimed is:

1. A process for assembling a sealing means on a trunnion wherein the end face of the trunnion and the internal end face of a bearing race which would be subsequently positioned on said trunnion are formed as cooperating thrust surfaces and the inner end of said bearing race adjacent the open end thereof is adapted as a seal engaging surface and said sealing means includes a metallic element and resilient means with the metallic element including an annular base portion and an annular trunnion pressing portion and with said resilient means including an annular lip portion adapted to be positioned between said base portion and the seal engaging surface of said bearing race comprising the steps of
    (a) positioning said sealing means in an axially aligned relationship with said trunnion,
    (b) pressing on said metallic element of said sealing means and pressing the latter axially relative to said trunnion until said metallic element is pressingly secured to said trunnion at a position wherein said annular lip portion is at a distance from the thrust face of said trunnion of .012 to .030 inch less than the distance from the bearing race thrust surface to the seal engaging surface of said bearing race,
    (c) whereby, when a bearing race is positioned on said trunnion with the end faces thereof in thrusting engagement, the seal engaging surface and said annular lip portion will be sealingly engaged with and said lip portion deformed .012 to .030 inch.

2. A process for assembling a sealing means on a trunnion wherein the end face of the trunnion and the internal end face of a bearing race which would be subsequently positioned on said trunnion are formed as cooperating thrust surfaces and the inner end of said bearing race adjacent the open end thereof is adapted as a seal engaging surface and said sealing means includes a metallic element and resilient means with the metallic element including an annular base portion and an annular trunnion pressing portion and with said resilient means including an annular lip portion adapted to be positioned between said base portion and the seal engaging surface of said bearing race comprising the steps of
    (a) positioning said sealing means in an axially aligned relationship with said trunnion,
    (b) pressing said sealing means on said trunnion with a tool which pressingly engages solely said annular trunnion pressing portion until said annular lip portion is at a distance from the thrust face of said trunnion of .012 to .030 inch less than the distance from the bearing race thrust surface to the seal engaging surface of said bearing race,
    (c) whereby, when a bearing race is positioned on said trunnion with the thrust faces thereof in thrusting engagement, the seal engaging surface and said annular lip portion will be sealingly engaged and said lip portion deformed .012 to .030 inch.

3. A process for assembling a sealing means on a trunnion which trunnion has a bearing engaging first diameter adjoining the end face thereof and a seal engaging second diameter of greater diameter than said bearing engaging diameter disposed adjacent said first diameter with a shoulder connecting said diameters and wherein the end face of said trunnion and the internal end face of a bearing race which would be subsequently positioned on said trunnion are formed as cooperating thrust surfaces and the inner end of said bearing race adjacent the open end thereof is adapted as a seal engaging surface and said sealing means includes a metallic element and resilient means with the metallic element including an annular base portion and an annular trunnion pressing portion of slightly smaller inner diameter than said second diameter and larger than said first diameter and with said resilient means including an annular lip portion adapted to be positioned between said base portion and the seal engaging surface of said bearing race comprising the steps of
    (a) placing an annular guide member about said first diameter of said trunnion and against said shoulder, which member has an outer diameter less than said second diameter and an inner diameter slightly greater than said first diameter,
    (b) positioning said sealing means about said first diameter of said trunnion and resting against said guide member,
    (c) pressing on said sealing means with an annular tool which pressingly engages solely said annular trunnion pressing portion and forcing said sealing means over said guide member and onto said second diameter until said annular lip portion is at a distance from said trunnion thrust face of .012 to .030 inch less than the distance from the bearing race thrust face to the seal engaging surface of said bearing race,
    (d) and removing said tool and said guide member,
    (e) whereby, when a bearing race is positioned on said trunnion with the thrust faces thereof in thrusting engagement, the seal engaging surface and said annular lip portion will be sealingly engaged and said lip portion deformed .012 to .030 inch.

4. A process for assembling a sealing means on a trunnion wherein the end face of a trunnion and the internal end face of a bearing race which would be subsequently positioned on said trunnion are formed as cooperating thrust surfaces and the inner end of said bearing race adjacent the open end thereof is adapted as a seal engaging surface and said sealing means includes a metallic element and resilient means with the metallic element including integral annular base and trunnion pressing portions and with said resilient means including an annular lip portion adapted to be positioned between said base portion and the seal engaging surface of said bearing race comprising the steps of
  (a) positioning said sealing means in an axially aligned relationship with said trunnion,
  (b) pressing said sealing means on said trunnion with a tool which pressingly engages solely said annular trunnion pressing portion until said annular lip portion is a predetermined distance from the thrust face of said trunnion which is a predetermined amount of approximately .012 to .030 inch less than the distance from the bearing race thrust surface to the seal engaging surface of said bearing race,
  (c) whereby, when said bearing race is positioned on said trunnion with the thrust faces thereof in a thrusting relationship, the seal engaging surface and said annular lip portion will be sealingly engaged and said lip portion deformed a controlled amount of approximately .012 to .030 inch.

5. A process for assembling a sealing means on a trunnion which trunnion has a bearing engaging first diameter adjoining the end face thereof and a seal engaging second diameter of greater diameter than said bearing engaging diameter disposed adjacent said first diameter with a shoulder connecting said diameters and wherein the end face of said trunnion and the internal end face of a bearing race which would be subsequently positioned on said trunnion are formed as cooperating thrust surfaces and an inner end of said bearing race adjacent the open end thereof is adapted as a seal engaging surface and said sealing means includes a metallic element and resilient means with the metallic element including an annular base portion and an annular trunnion pressing portion of slightly smaller inner diameter than said second diameter and larger than said first diameter and with said resilient means including an annular lip portion adapted to be positioned between said base portion and the seal engaging surface of said bearing race comprising the steps of
  (a) placing an annular guide member about said first diameter of said trunnion and against said shoulder, which member has an outer diameter less than said second diameter and an inner diameter slightly greater than said first diameter,
  (b) positioning said sealing means about said first diameter of said trunnion and resting against said guide member,
  (c) pressing on said sealing means with an annular tool which pressingly engages solely said annular trunnion pressing portion and forcing said sealing means over said guide member and onto said second diameter until said annular lip portion is at a distance from said trunnion thrust face which is a predetermined amount of approximately .012 to .030 inch less than the distance from the bearing race thrust face to the seal engaging surface of said bearing race,
  (d) and removing said tool and said guide member,
  (e) whereby, when a bearing race is positioned on said trunnion with the thrust faces thereof in a thrusting relationship, the seal engaging surface and said annular lip portion will be sealingly engaged and said lip portion deformed a controlled amount of approximately .012 to .030 inch.

6. A process for assembling a sealing means on a trunnion of a journal cross having two pairs of opposed trunnions with each trunnion having a bearing engaging first diameter adjoining the end face thereof and a seal engaging second diameter of greater diameter than said bearing engaging diameter disposed adjacent said first diameter with a shoulder connecting said diameters and wherein the end face of said trunnion and the internal end face of a bearing race which would be subsequently positioned on a trunnion are formed as cooperating thrust surfaces and an inner end of said bearing race adjacent the open end thereof is adapted as a seal engaging surface and said sealing means includes a resilient means bonded to a metallic element with the metallic element including an annular base portion and an annular trunnion pressing portion of slightly smaller inner diameter than said second diameter and larger than said first diameter and with said resilient means including a first annular lip portion adapted to sealingly engage the seal engaging surface of said bearing race and a second annular lip portion adapted to sealingly engage the periphery of said bearing race and an annular space between said first and second lip portions comprising the steps of
  (a) holding a first trunnion of said journal cross stationary by placing the second trunnion opposed to said first trunnion in a holding fixture,
  (b) placing an annular guide member about said first diameter of said first trunnion and against said shoulder, which guide member has an outer diameter less than the second diameter and an inner diameter slightly greater than said first diameter,
  (c) positioning said sealing means about said first diameter of said first trunnion and resting against said guide member,
  (d) pressing on said sealing means with an annular tool which pressingly engages solely said annular trunnion pressing portion and forcing said sealing means over said guide member and onto said second diameter of said first trunnion until said annular lip portion is at a distance from said first trunnion thrust face which is a predetermined amount of approximately .012 to .030 inch less than the distance from the bearing race thrust face to the seal engaging surface of said bearing race,
  (e) and removing said tool and said guide member,
  (f) whereby when a bearing race is positioned on said first trunnion with the thrust faces thereof in thrusting engagement, said second lip portion will engage the periphery of said bearing race and the seal engaging surface and said first annular lip portion will be sealingly engaged and said first lip portion deformed a controlled amount of approximately .012 to .030 inch.

References Cited by the Examiner
UNITED STATES PATENTS

| | | | |
|---|---|---|---|
| 2,209,854 | 7/1940 | Slaght | 64—17 |
| 2,586,087 | 2/1952 | Reynolds | 29—148.4 |
| 2,773,367 | 12/1956 | Slaght | 64—17 |
| 2,850,792 | 9/1958 | Cobb | 29—148.4 |

WHITMORE A. WILTZ, *Primary Examiner.*

ROBERT C. RIORDON, THOMAS H. EAGER,
*Examiners.*